Sept. 7, 1965    R. LOOKER    3,204,331
METHOD OF INTERCONNECTING MEMBERS WITH
A GROOVED PIN AND REFORMABLE COLLAR
Original Filed Feb. 11, 1957    4 Sheets-Sheet 1
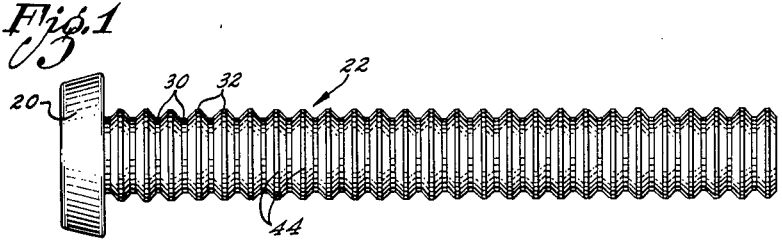
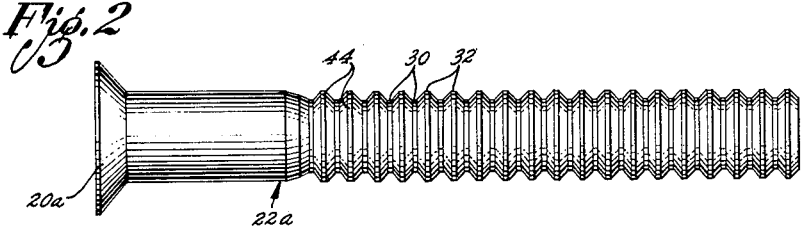
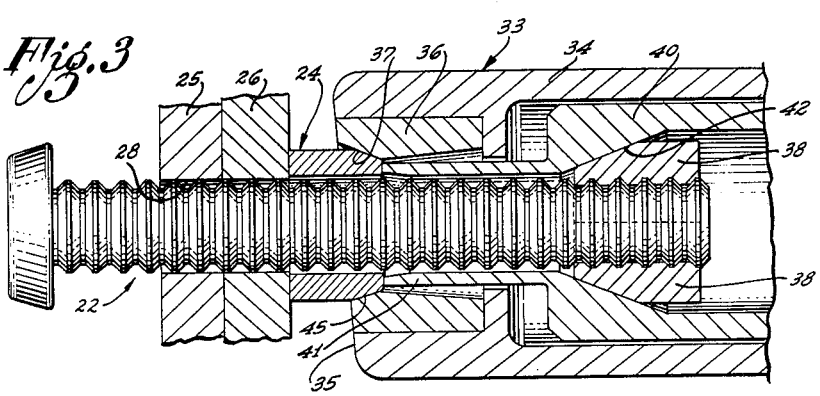
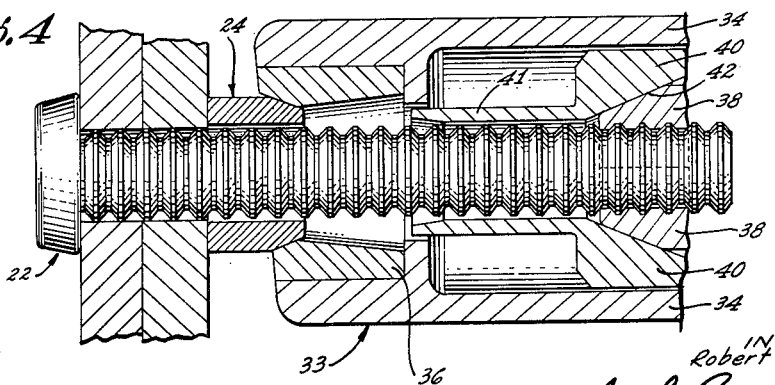
INVENTOR:
Robert Looker
By Smyth, Roston & Pavitt
Attorneys Sept. 7, 1965   R. LOOKER   3,204,331
METHOD OF INTERCONNECTING MEMBERS WITH
A GROOVED PIN AND REFORMABLE COLLAR
Original Filed Feb. 11, 1957   4 Sheets-Sheet 2
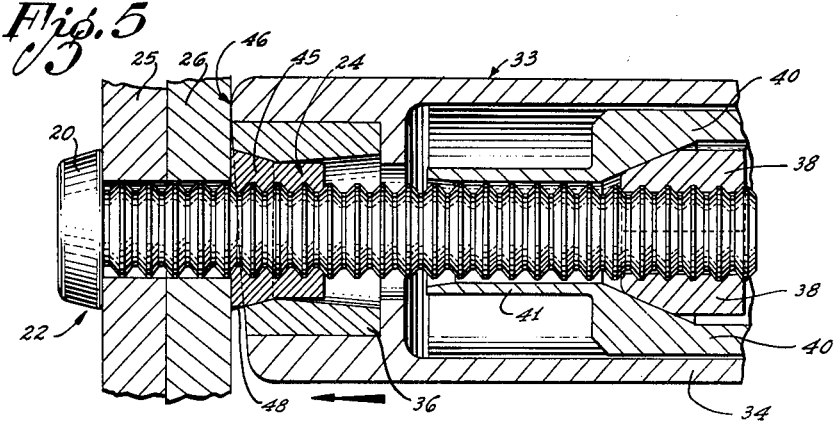
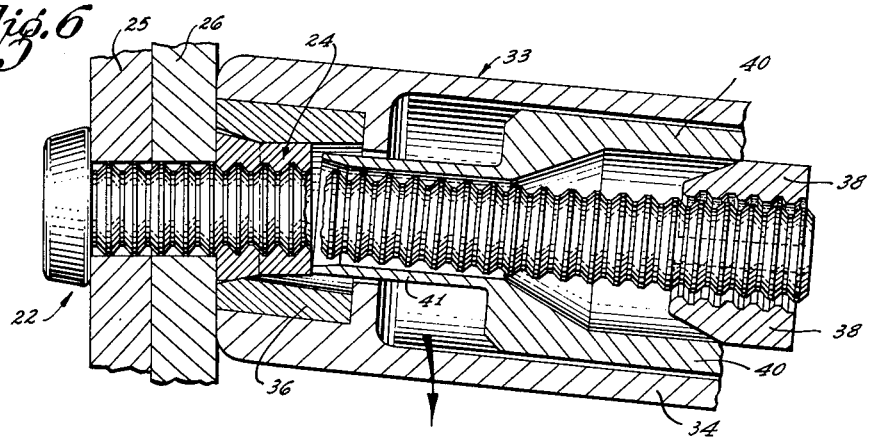
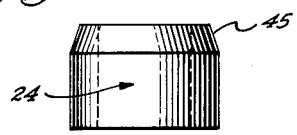 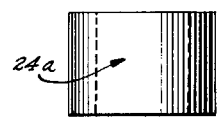
INVENTOR:
Robert Looker
Attorneys

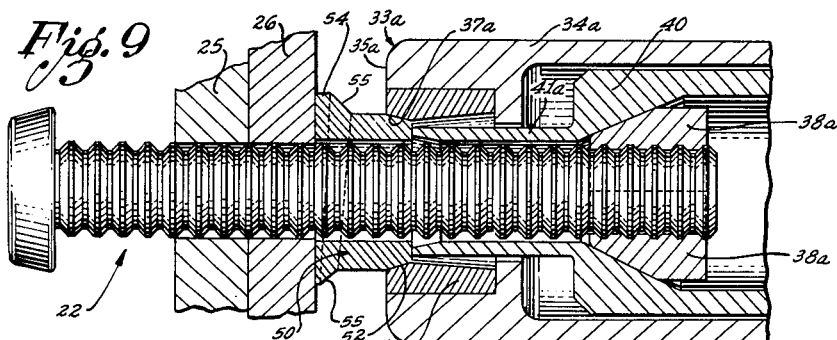
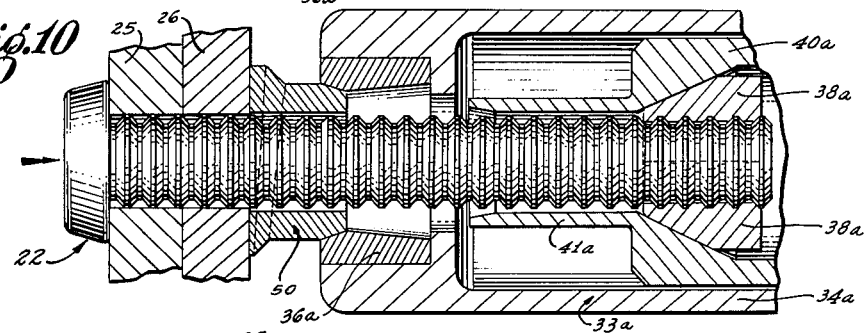
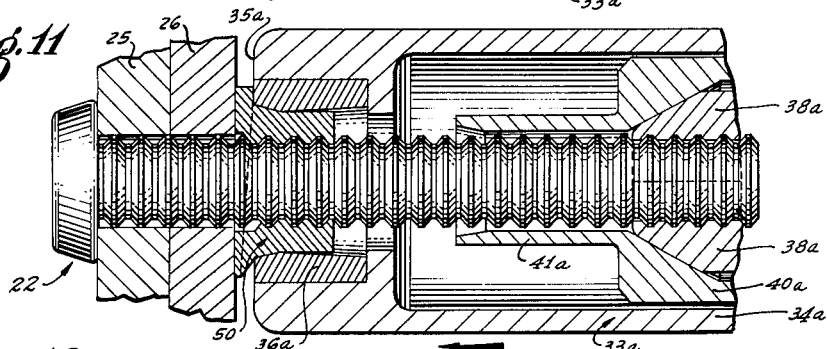
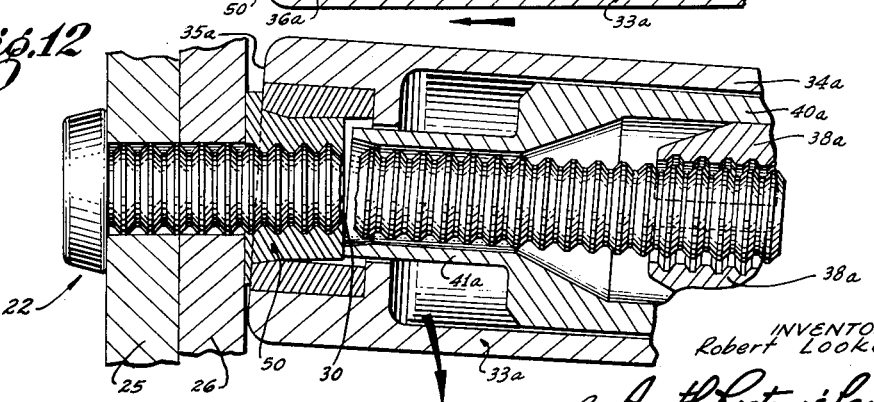

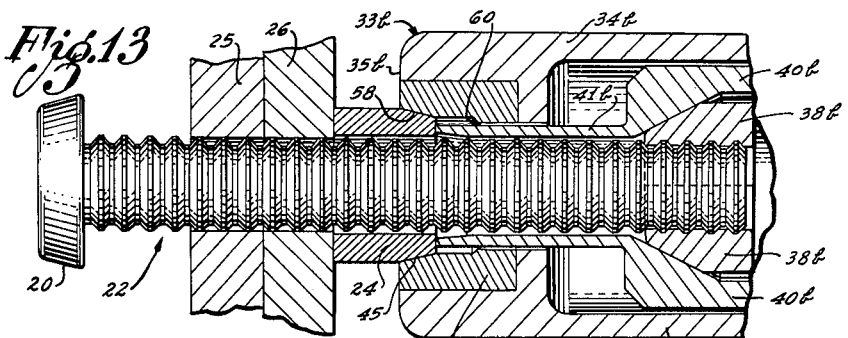
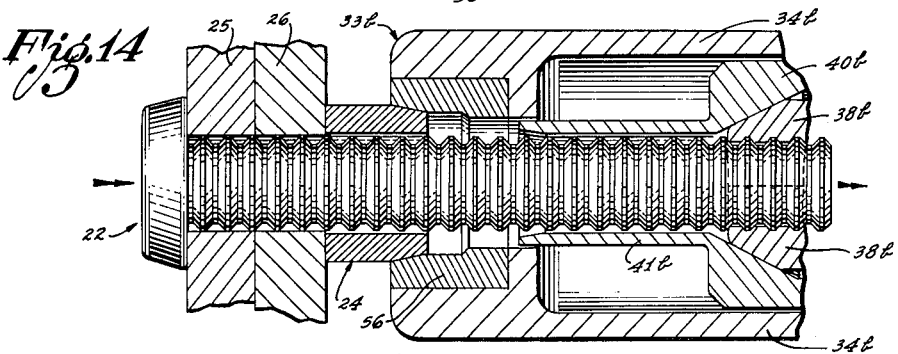
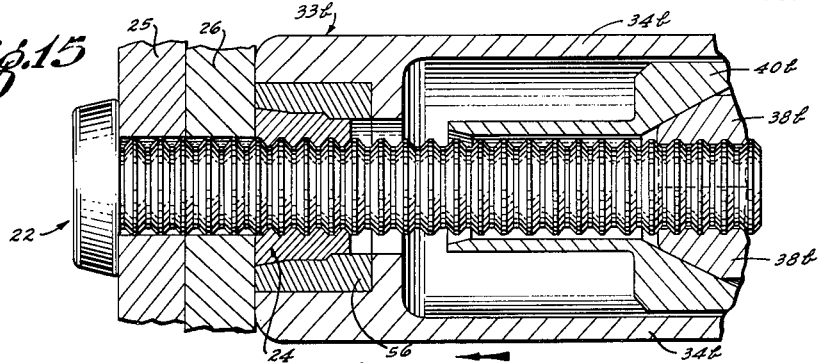
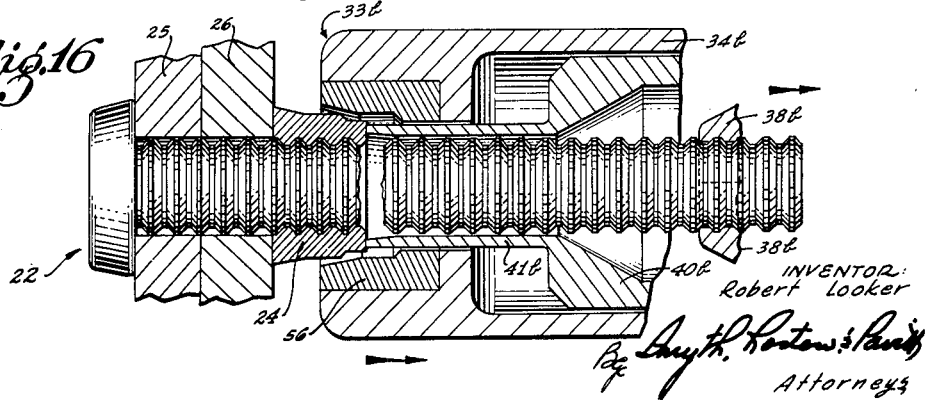

United States Patent Office 3,204,331
Patented Sept. 7, 1965

3,204,331
METHOD OF INTERCONNECTING MEMBERS WITH A GROOVED PIN AND REFORMABLE COLLAR
Robert Looker, Santa Monica, Calif., assignor to Brown-Line Corporation, Redondo Beach, Calif., a corporation of California
Continuation of application Ser. No. 55,017, Sept. 9, 1960, which is a division of application Ser. No. 639,474, Feb. 11, 1957, now Patent No. 2,978,946, dated Apr. 11, 1961. This application Feb. 10, 1965, Ser. No. 433,846
9 Claims. (Cl. 29—446)

This application is a continuation of my copending application Serial No. 55,017, filed September 9, 1960, entitled "Method of Interconnecting Members With a Grooved Pin and Reformable Collar," which application, in turn, is a division of my application Serial No. 639,474, filed February 11, 1957, and entitled "Grooved Pin With Reformable Collar to Accommodate Various Thickness," now issued as Patent No. 2,978,946.

This invention relates to a method of interconnecting a plurality of members, such as metal plates, by means of a pin having a plurality of circumferential grooves and by means of a cooperating collar that is swaged into engagement with the grooves of the pin.

It is a common practice to interconnect a plurality of members, such as metal plates, by a headed serrated pin that is inserted into aligned openings of the plurality of members. The head of the pin engages one side of the plurality of members and a deformable collar is swaged onto the serrated shank of the pin in engagement with the other side of the plurality of members. What may be termed a driving tool is customarily used to install such a headed pin, the driving tool having two sections axially movable relative to each other. One section of the driving tool has jaws to engage the pin to pull the pin into its installed position with the pin under tension. The other section of the driving tool has what is commonly termed an anvil in the form of an annular member to engage and swage the deformable collar in reaction to the tension force that is applied to the pin.

Different portions of the shank of such a pin member have different functions. A first portion of the shank immediately adjacent the pin head ultimately fills the aligned openings of the plurality of members and, therefore, its primary requisite is to fit the holes with sufficient snugness to hold the holes in permanent alignment. A second portion of the shank adjacent this first portion must be suitably serrated for positive locking engagement by the deformable collar. A third portion of the shank immediately adjacent this second portion is weakened to form a break neck where the surplus end portion of the pin may be broken off to complete the installation procedure. A fourth shank portion extending to the end of the pin must be suitably serrated for positive engagement by the jaws of the driving tool.

Heretofore, each of these portions of the pin shank has been specialized for its particular purpose. The first shank portion may, for example, have a smooth cylindrical configuration for forced or snug fit into the aligned holes of the plurality of members. The second shank portion may comprise a series of teeth, or ribs, or the like for positive engagement by the deformable collar. The third portion is formed with a relatively deep circumferential groove which provides the weakest part of the shank where the pin is to be broken off. The fourth or end portion of the shank is of suitably serrated configuration for positive engagement by the jaws of the driving tool.

It is apparent that the first portion of the shank adjacent the head of the pin must be accurately dimensioned in length in accord with the total thickness of the plurality of members that are to be secured together. Making this first shank portion too short causes a number of difficulties. One difficulty is that some serrations of the second portion will be positioned inside the aligned openings of the member and these serrations as conventionally formed are not efficient for alignment of the holes of the plurality of members. In the second place, the extent to which this second portion of the shank lies in the aligned openings reduces the extent to which the second shank portion is available for engagement by the deformable collar and thus, reduces the effective strength of the installed pin member. In the third place, the breakneck portion may be shifted into the interior of the deformable collar where it is not readily accessible for severance and where severance would seriously weaken the effective strength of the installed pin member.

On the other hand, making the first shank portion of the pin too long also results in troublesome difficulties. In the first place, part of the first shank portion extends into the interior of the collar, and since this part is not adapted for positive engagement by the collar, the effective strength of the installed pin member is correspondingly reduced. In the second place, the third or breakneck portion of the shank is shifted to an excessive distance from the outer end of the deformable collar so that when the pin is severed at the breakneck portion, the remaining installed portion of the pin is unduly long.

To avoid these difficulties, conventional pin members are made in different lengths with the first shank portion of the pin members necessarily manufactured especially to suit the total thickness of the plurality of members being joined together. One consequence of specializing the pins in this manner for different total member thicknesses is that it is necessary to purchase and stock a relatively large number of different lengths of the pin members to cover a usual range of total member thicknesses found to exist in most assemblies so joined together, since there is always a possibility that one size will be exhausted at a critical time. Another consequence is that the burden is placed on the craftsman to select the different pin members with care to fit different installations, since an error usually means that the misfit pin member must be removed and discarded with consequent waste of time and material. Having many different sizes to purchase also means higher material cost as price varies inversely with quantity of any one size.

The present invention is directed to the problem of avoiding all of these difficulties and undesirable consequences. The attainment of this purpose is based on the concept of avoiding specialization of the different shank portions, or at least of minimizing differentiation among the shank portions. In fact, in the preferred practice of the invention there is no differentiation whatsoever and all of the four mentioned shank portions are capable of performing all of the described functions with equal effectiveness.

This concept makes it possible to use a single headed pin for securing together pluralities of members having a wide range of total thicknesses. Only one pin need be stocked for the whole range of total member thicknesses and the craftsman is relieved entirely of the burden of selecting particular pins for particular installations.

It will be apparent to those skilled in the art that this basic concept may be carried out in various ways in various practices of the invention. In the preferred practice of the invention, a pin is provided of the maximum length required for a given range of total member thicknesses and the pin shank is provided with a series of axially spaced uniform recesses starting at a point sufficiently close to the pin head and extending to the end of the pin. This point is at least close enough to the head to lie in the inner end of the deformable collar when used with a plurality of members of minimum total thickness in the given range of total member thicknesses. If desired, however, the series of uniform recesses may extend right up to the pin head.

In the preferred practice of the invention, the shank recesses comprise uniformly spaced circumferential grooves which form uniform intervening circumferential ribs, the shank being undifferentiated throughout the length of the recessed portion. With the ribs of an outside diameter to fit snugly into the aligned holes and with the ribs adequately closely spaced relative to the thickness of the individual members of the pluralities of members, the uniformly grooved portion of the shank is capable of holding the holes in the pluralities of members in permanent alignment. The statement that the ribs are adequately closely spaced relative to the individual members means that the spacing between the successive ribs must be substantially less than the minimum thickness of the individual members of the plurality of members that are to be secured together by the pin. Such close spacing of the ribs insures that at least one rib will extend into the space defined by the planes of the opposite faces of each of the plurality of members for positively maintaining the member in accurate alignment with the adjacent members. As will be made apparent, it is contemplated in one practice of the invention that the ribs will be so dimensioned and spaced relative to the thickness of the members to be secured together that at least two ribs will engage each of the members to insure accurate alignment of the openings of the members. The grooves and ribs provide a serrated configuration for highly effective engagement of the shank by the deformable collar. Each of the grooves is capable of serving as a breakneck so that the grooves may be employed selectively as breaknecks as required by the given range of total member thicknesses. Finally, the serrated configuration provided by the grooves and ribs makes it possible for the jaws of the driving tool to grip the end of the pin shank with the desired effectiveness.

A certain problem arises with regard to the function of the circumferential grooves as selective breaknecks. The use of tension stress in the prevalent prior art practices to cause severance of a breakneck portion requires that the breakneck portion may be greatly weakened. One reason for greatly weakening the pin at this point is that the single breakneck of the prior art fastener must be the weakest point of the pin by a liberal margin to make sure that the shank breaks off at this particular point in response to the final tensioning of the pin. A second reason for greatly weakening the pin at the breakneck is to keep the required magnitude of tension force within practical limits. Obviously, if such a highly weakened point of the shank were positioned in the aligned holes of the plurality of members or were even positioned inside the deformable collar, the effective strength of the installed pin member would be reduced to an unacceptable degree. The problem, then, is to provide spaced circumferential grooves that are deep enough for selective use as breaknecks but, nevertheless, provide sufficient strength to carry the tensile load required of the installed pin member.

The present invention solves this dilemma by combining two separate forces to break off the pin at circumferential grooves selectively. The first force is the usual tension force for straining the shank longitudinally. The second force is a localized transverse force. The addition of this second transverse force has two advantages. One advantage is that the combining of the two forces makes it possible to break the shank at the axially spaced grooves without requiring that the axially spaced grooves be so deep as to weaken the pin member unduly. The second advantage is that the transverse force may be selectively localized to cause the pin to break off at any selected circumferential groove.

The second transversely applied stress may be, for example, either a localized bending stress or a localized transverse compression stress. The compression stress may be, if desired, radial compression applied uniformly around the circumference of the pin shank.

A further and important feature of the invention is that a driving tool of a well known type can be used not only to install the pin member but also to provide the second transverse stress automatically as soon as the deformable collar is adequately swaged into positive engagement with the pin shank. In one practice of the invention, the driving tool has a canted leading end or nose that fulcrums against the plurality of members to create the second transverse stress automatically when the collar is adequately swaged. In another practice of the invention, the driving tool has a nose of normal configuration but the deformable collar cooperates with the driving tool to cause the canting movement of the tool for creation of the second transverse stress. In still another practice of the invention, the driving tool has two successively effective swaging elements, the first element swaging the collar into positive engagement with the pin shank and the second swaging element radially compressing the swaged collar at its outer end to cause correspondingly localized radial compression of the pin shank.

The various features and advantages of the invention will be apparent from the following detailed description considered with the accompanying drawings.

In the drawings, which are to be regarded as merely illustrative:

FIGURE 1 is a side elevation of a headed pin employed in one practice of the invention, the whole length of the shank of the pin being provided with uniformly spaced circumferential grooves;

FIGURE 2 is a similar view of another headed pin that may be employed wherein the series of circumferential grooves starts at a substantial distance from the pin head;

FIGURES 3, 4, 5 and 6 show successive stages in the procedure of installing the pin of FIGURE 1 by means of a driving tool, the driving tool having a canted nose or leading end to create a correctly timed localized bending moment for severance of the tension pin shank at a selected circumferential groove;

FIGURE 7 is a side elevation of the deformable collar shown in FIGURES 3 to 6;

FIGURE 8 is a side elevation of a deformable collar of slightly different configuration that may be employed;

FIGURES 9, 10, 11 and 12 are stages in a second installation procedure wherein a conventional driving tool cooperates with a deformable collar that has a peripheral shoulder to cause the required canting of the driving tool automatically after the deformable collar is swaged into engagement with pin shank; and FIGURES 13, 14, 15 and 16 illustrate the stages in a third procedure for installing the pin of FIGURE 1 by means of a driving tool, the driving tool being provided with two successively effective swaging elements, the second of which constricts the swaged collar near its outer end to create localized radial compressive stress in the pin shank to cause the pin to break at a corresponding circumferential groove.

FIGURE 1 shows a pin with a head 20 and a shank, generally designated 22, that, as shown in FIGURES 3 to 6, may be employed with a deformable collar 24 to interconnect a plurality of members, such as a pair of plate members 25 and 26 having aligned openings or bores 28 therein. The shank 22 has a series of circumferential grooves 30 which are preferably uniformly spaced to form a series of uniform intervening circumferential ribs 32. In the preferred practice of the invention, it is contemplated that the installation will be accomplished by means of a driving tool of the general character disclosed in the Huck et al. Patent 2,053,718; the Huck et al. Patent 2,053,719; the Huck Patent 2,114,493; and the Huck Patent 2,527,307.

As indicated in FIGURES 3 to 6, a driving tool of this character, generally designated by the numeral 33, has two sections adapted for axial movement relative to each other. One section includes a barrel 34 having a leading end face 35, this barrel carrying an anvil or annular swaging element 36 for constricting the deformable collar 24 into positive engagement with the pin shank 22. For this purpose, the swaging element 36 has a tapered annular surface 37 at its leading end adapted to slide onto the deformable collar 24 with the desired constricting swaging effect. The second section of the driving tool includes a radially expansible and constractable set of jaws 38 and a surrounding cylindrical jaw-actuating member 40. The member 40 has a tubular extension 41 and is formed with a tapered inner surface 42 for co-operation with the set of jaws 38 to constrict the jaws into positive engagement with the pin shank 22.

In FIGURE 1, the series of grooves 30 extends all the way from the outer end of the pin shank to the head 20. It is to be understood, however, that the distance from the pin head to the first groove of the series of grooves may be as short as the minimum total thickness of a plurality of members in the contemplated range of total member thicknesses for which the pin member is designed. For example, if the pin member that includes the pin shown in FIGURE 1 is to be used to interconnect a plurality of plate members varying in total thickness from a minimum of ⅜ of an inch to a maximum of an inch or more, the series of circumferential grooves 30 may start at a point ⅜ of an inch from the pin head. Thus, FIGURE 2 shows a second pin having a tapered head 20a and a shank 22a. The shank 22a has the usual circumferential grooves 30 forming intervening ribs 32 but a portion of the shank adjacent the head 20a is of smooth cylindrical configuration. The length of this smooth portion is the minimum thickness in the contemplated range of total thicknesses of the pluralities of members for which the pin member is designed.

As may be seen in FIGURES 3 to 6, the ouside diameter of the circumferential ribs 32 approximates the inside diameter of the openings 28 in the members 25 and 26 so that the ribs fit into these openings with sufficient snugness to hold the openings in permanent alignment when the pin member is completely installed. The circumferential ribs 32 may have cylindrical peripheral surfaces 44 or the ribs may be rounded in cross section if desired.

The grooves 30 and the ribs 32 provide a serrated configuration for high effective engagement by the collar 24 as well as for highly effective engagement by the set of jaws 38. It is further to be noted that the grooves 30 are of sufficient depth to permit the pin to be broken off at a selected groove by the application of stress in tension together with the application of a transverse stress as heretofore described. This groove depth, however, is much less than the groove depth required for the breakneck of a conventional pin.

The leading end face 35 of the driving tool 33 used in FIGURES 3 to 6 is canted, i.e., inclined away from the usual plane perpendicular to the longitudinal axis of the tool. Thus, as shown in FIGURES 3 to 6, the leading end face 35 of the driving tool 33 is initially inclined out of parallel to the two plate members 25 and 26.

In the installation procedure illustrated by FIGURES 3 to 6, the headed pin is first inserted into the aligned openings 28, the deformable collar 24 is slipped over the end of the pin, and then the driving tool 33 is manipulated to cause the jaws 38 to grip the end of the serrated pin shank as shown in FIGURE 3 with the swaging element 36 abutting a tapered end surface 45 of the deformable collar 24. It is apparent that to make this procedure possible for interconnecting pluralities of members of varying total thicknesses over a range from a given minimum total thickness to a given maximum total thickness, the length of the shank of the serrated pin must be substantially greater than the given maximum total thickness plus the axial dimension of the deformable collar to insure that a portion of the pin will extend beyond the deformable collar for engagement by the jaws of the driving tool.

In a well-known manner, the set of jaws 38 exerts pull on the headed pin with the reaction force of the pull exerted against the deformable collar 24. Consequently, the pull on the headed pin draws the pin to the position shown in FIGURE 4 with the head 20 in abutment with one side of the plurality of members 25 and 26 and with the deformable collar 24 in abutment against the other side of the plurality of members. The reaction force exerted against the collar 24 in response to this initial axial displacement of the pin is not sufficient to deform the collar to any significant degree.

With continued movement of the set of jaws 38 axially away from the swaging element 36, the reaction force exerted against the deformable collar 24 causes the tapered restricting surface 37 to slide over the length of the collar 24 with consequent radial constriction of the collar into positive engagement with the serrated pin shank as shown in FIGURE 5. Up to this point, the installation operation follows the usual stages in the installation of a pin member by a driving tool of this type. At this point in the installation operation, however, the force in reaction to the pull on the pin shank is transferred from the deformable collar 24 to the face of the adjacent plate member 26 and since the leading end face 37 of the driving tool is canted with the point of pressure against the plate member offset from the pin, the driving tool tends to fulcrum on the pressure point and thus tilt or swing away from alignment with the pin. Thus, in FIGURE 5, with increasing pull on the shank of the pin, the driving tool tends to fulcrum about the pressure contact point 46 and to rock towards a position with the leading end face 35 flat against the plate member 26.

As a result of this reaction tilting force, the set of jaws 38 applies a bending moment to the shank of the pin. The bending stress is concentrated or localized at the outer end of the deformed collar 24 since the deformed collar cooperates with the plate members 25 and 26 to reinforce the shank to resist bending beyond this point. This localized bending stress increases in magnitude as the tension stress of the pin increases until, as shown in FIGURE 6, the pin snaps off at whatever circumferential groove 30 is adjacent the outer end of the collar. It is apparent that this final breaking action occurs automatically in response to the continued axial separation of the two sections of the driving tool 33.

It may be noted that, because of the canted nose configuration of the driving tool and because this canted configuration is shared by the swaging element 36, the swaging element does not reach a portion 48 of the deformable collar 24 at the stage shown in FIGURE 5. The subsequent canting of the driving tool, however, tends to rock the swaging element 36 to the position shown in FIGURE 6 with a snap action to complete the deformation of the collar into positive engagement with the pin shank.

When the pin shank breaks off at the selected circumferential groove 30, the tool may tend to remain in engagement with the swaged collar but the jaw-actuating member 40 is immediately shifted forward to release the severed end of the pin shank and the consequent forward movement of the tubular extension 41 of the jaw-actuating member frees the tool. Thus, FIGURE 6 shows how the tubular extension 41 moves against the deformed collar to force the swaging element 36 out of engagement with the deformed collar.

The deformable collar 24, in this first described practice of the invention, has the configuration shown in FIGURE 7, being formed with the previously mentioned tapered end surface 45. It is to be understood, however, that the deformable collar may be of various configurations. FIGURE 8, for example, shows a deformable collar 24a that is of the configuration of a plain cylindrical sleeve.

In a second practice of the invention illustrated by FIGURES 9 to 12, a conventional driving tool 33a is employed without modification. The canting of the tool at the end of the installation operation is accomplished by employing a deformable collar 50 of special configuration.

The conventional driving tool 33a has the usual barrel 34a with a leading end face 35a that is normal to the axis of the tool. The barrel 34a carries the usual symmetrical swaging element 36a having the usual constricting swaging surface 37a. The usual set of jaws 38a is controlled by a jaw-actuating member 40a having a tubular extension 41a.

The deformable collar 50 has a tapered end surface 52 for initial engagement by the swaging element 36a. The base end of the deformable collar 50 is formed with a radial enlargement 54 which is of canted diametrical cross-sectional configuration, the enlargement providing a tapered circumferential shoulder in the path of the leading end of the swaging element 36a.

The first two stages of the installation operation in this second practice of the invention illustrated by FIGURES 9 and 10 are the same as the first two stages of the first described practice of the invention. When the swaging element 36a in deforming the collar 50 reaches the point shown in FIGURE 11, however, the canted shoulder 55 of the collar tends to cause the driving tool 33a to cant to the position shown in FIGURE 12. In this manner, the canted configuration of the deformable collar causes the driving tool to place the pin shank under bending stress at the selected annular groove 30 for severance of the pin shank. After the end of the pin breaks off, the tubular extension 41 of the jaw-actuating member pushes against the deformed collar to free the driving tool from the collar.

The third practice of the invention illustrated by the FIGURES 13 to 16 employs a driving tool 33b having the usual barrel 34b, the barrel having a nose or leading end face 35b normal to the axis of the tool. The driving tool 33b has the usual set of jaws 38b controlled by a jaw-actuating member 40b, the jaw-actuating member having the usual tubular extension 41b.

The tool 33b differs from the conventional driving tool in having a swaging member 56 that may be considered as comprising two constricting swaging elements. Thus, the swaging member 56 has a first or leading constricting swaging surface 58 and a second subsequently effective constricting swaging surface 60 that steps down in diameter. This driving tool is employed with a conventional deformable collar, such as the previously described deformable collar 24.

Here again, the first two stages of the installation operation shown in FIGURES 13 and 14 are the same as in the first described operation. As the driving tool approaches the stage shown in FIGURE 15 to complete the swaging of the collar 24, however, the second constricting swaging surface 60 constricts the outer end of the collar 24 and thus subjects the corresponding region of the pin shank to concentrated high magnitude radial compression. With continued rise in the force of separation acting between the two sections of the driving tool, the tension of the pin shank correspondingly increases until the tension stress combined with the localized radial compression stress causes the pin shank to break at the selected circumferential groove, as shown in FIGURE 16. Usually, the reaction of the tool to the breaking of the pin frees the tool from the deformed collar. If not, the immediate advance of the tubular extension 41b of the jaw-actuating member 40b forces the tool free.

My description in specific detail of the selected practices of the invention will suggest various changes, substitutions, and other departures from my disclosure within the spirit and scope of the appended claims.

I claim:
1. In the method of fastening together a plurality members having aligned openings, wherein a headed pin is inserted through the openings, a collar is positioned against the other side of the plurality of members and is deformed into engagement with the pin by a driving tool with the tool engaging the end of the pin to hold the pin in tension, and then the surplus end portion of the pin is broken off, the improvement which consists of providing a headed pin of adequate length for a plurality of members of maximum total thickness in a given range of total thicknesses, with a series of peripheral recesses on the shank of the pin at less axial spacing than the thickness of the thinnest member of said plurality of members, said series of recesses extending close enough to the pin head for engagement by the collar at the minimum total member thickness in said range and extending sufficiently close to the opposite end of the pin for engagement by said tool at the maximum total member thickness of said range, the pin being dimensioned in cross section between the recesses for snug fit into said openings to hold the openings in alignment when the total member thickness is greater than the minimum in said range, inserting the pin into the aligned openings of a plurality of members of a total thickness in said range, swaging said collar into engagement with the recesses in the shank of the pin, placing the pin under tension and simultaneously subjecting the tensioned pin to lateral stress localized adjacent the outer end of said collar, with the tension and lateral stress of sufficient magnitude to break off the pin at one of said recesses adjacent the outer end of the collar.

2. A method of fastening together a plurality of members having aligned openings therein characterized by the use of a headed pin with a series of longitudinally spaced circumferential breakneck grooves in its shank at less spacing axially of the shank then the thickness of the thinnest of said members and the use of a collar for deformation into engagement with the breakneck grooves selectively in accord with the total thickness of the plurality of members, said method including the steps of:
  inserting said pin into said aligned openings with the head of the pin in abutment against one side of the plurality of members;
  placing said collar on the pin shank in abutment against the other side of the plurality of members;
  deforming the collar into engagement with at least one of the breakneck grooves while holding the pin under tension and while pressing the collar against said other side of the plurality of members; and
  subjecting the pin to a nonaxial stress at a selected exposed breakneck groove near the outer end of the collar to break off the surplus portion of the pin.

3. A method of fastening together a plurality of members having aligned openings therein characterized by the use of a headed pin with a series of longitudinally spaced circumferential breakneck grooves in its shank at less spacing axially of the shank than the thickness of the thinnest of said members and the use of a collar for deformation into engagement with the breakneck grooves selectively in accord with the total thickness of the plurality of members, said method including the steps of:
  inserting said pin into said aligned openings with the head of the pin in abutment against one side of the plurality of members;
  placing said collar on the pin shank in abutment against the other side of the plurality of members;
  deforming the collar into engagement with at least one of the breakneck grooves while holding the pin under axial stress in tension and while pressing the collar against said other side of the plurality of members;
  increasing the axial stress in tension of the pin; and
  simultaneously subjecting the pin to a nonaxial stress at a selected exposed breakeck groove near the outer end of the collar to break off a surplus portion of the pin.

4. A method of fastening together a plurality of members having aligned openings therein characterized by the use of a headed pin with a series of longitudinally spaced circumferential breakneck grooves in its shank at less spacing axially of the shank than the thickness of the thinnest of said members and the use of a collar for deformation into engagement with the breakneck grooves selectively in accord with the total thickness of the plurality of members, said method including the steps of:

inserting said pin into said aligned openings with the head of the pin in abutment against one side of the plurality of members;

placing said collar on the pin shank in abutment against the other side of the plurality of members;

deforming the collar into engagement with at least one of the breakneck grooves while holding the pin under axial stress in tension and while pressing the collar against said other side of the plurality of members;

increasing the axial stress in tension of the pin; and simultaneously subjecting the pin to localized transverse compression at a selected exposed breakneck grove near the outer end of the deformed collar to break off a surplus portion of the pin.

5. A method of fastening together a plurality of members having aligned openings therein characterized by the use of a headed pin with a series of longitudinally spaced circumferential breakneck grooves in its shank at less spacing axially of the shank than the thickness of the thinnest of said members and the use of a collar for deformation into engagement with the breakneck grooves selectively in accord with the total thickness of the plurality of members, said method including the steps of:

inserting said pin into said aligned openings with the head of the pin in abutment against one side of the plurality of members;

placing said collar on the pin shank in abutment against the other side of the plurality of members;

deforming the collar into engagement with at least one of the breakneck grooves while holding the pin under tension and while pressing the collar against said other side of the plurality of members; and subjecting the pin to a bending stress at a selected exposed breakneck groove near the outer end of the collar to break off the surplus portion of the pin.

6. In the method of fastening together of pluralities of members having aligned openings, wherein a headed pin is inserted through the openings, a collar is positioned against the other side of the plurality of members and is deformed into engagement with the pin by a driving tool with the tool engaging the end of the pin to hold the pin in tension, and then the surplus end portion of the pin is broken off, the improvement which consists of providing a headed pin of adequate length for a plurality of members, of maximum total thickness in a given range of total thicknesses, with a series of peripheral recesses on the shank of the pin at less axial spacing than the thickness of the thinnest member of said plurality of members, said series of recesses extending close enough to the pin head for engagement by the collar at the minimum total member thickness in said range and extending sufficiently close to the opposite end of the pin for engagement by said tool at the maximum total member thickness of said range, the pin being dimensioned in cross section between the recesses for snug fit into said openings to hold the openings in alignment when the total member thickness is greater than the minimum in said range, inserting the pin into the aligned openings of a plurality of members of a total thickness in said range, swaging said collar into engagement with the recesses in the shank of the pin, placing the pin under tension and simultaneously subjecting the tensioned pin to bending stress localized adjacent the outer end of said collar, with the tension and bending stress of sufficient magnitude to break off the pin at one of said recesses adjacent the outer end of the collar.

7. A method of fastening together a plurality of members having aligned openings therein characterized by the use of a headed pin with a series of longitudinally spaced circumferential breakneck grooves in its shank at less spacing axially of the shank than the thickness of the thinnest of said members and the use of a collar for deformation into engagement with the breakneck grooves selectively in accord with the total thickness of the plurality of members, said method including the steps of:

inserting said pin into said aligned openings with the head of the pin in abutment against one side of the plurality of members;

placing said collar on the pin shank in abutment against the other side of the plurality of members;

deforming the collar into engagement with at least one of the breakneck grooves while holding the pin under axial stress in tension and while pressing the collar against said other side of the plurality of members;

increasing the axial stress in tension of the pin; and simultaneously subjecting the pin to a bending stress at a selected exposed breakneck groove near the outer end of the collar to break off a surplus portion of the pin.

8. A method of fastening together a plurality of members having aligned openings therein characterized by the use of a headed pin and of a collar for deforming into engagement with the pin by the use of a driving tool, said method including the steps of:

inserting said pin into said aligned openings with the head of the pin in abutment against one side of the plurality of members;

placing said collar on the pin shank in abutment against the other side of the plurality of members;

deforming the collar into engagement with the pin by a driving tool with the tool engaging the end of the pin and while holding the pin in longitudinal tension; and subjecting the collar to transverse compression after the collar is deformed and while the pin is under longitudinal tension, with the transverse compression of the collar concentrated near the outer end of the collar for transmission by the collar to the pin itself to cause the pin to be broken off by the cooperation of the transverse compression force with the longitudinal tension force.

9. A method of fastening together a plurality of members having aligned openings therein characterized by the use of a headed pin and of a collar for deforming into engagement with the pin by the use of a driving tool, said method including the steps of:

inserting said pin into said aligned openings with the head of the pin in abutment against one side of the plurality of members;

placing said collar on the pin shank in abutment against the other side of the plurality of members;

deforming the collar into circumscribing compressive engagement with the pin by a driving tool, while holding the pin under tension by the tool engaging the end of the pin, and simultaneously pressing the collar against said other side of the plurality of members; and subjecting the collar to such radially inwardly compression force during the deformation thereof to thereby subject the pin to localized transverse compression near the outer end of the deformed collar while the pin is under longitudinal tension thereby to break off the surplus end portion of the pin near the outer end of the collar by the cooperation of the transverse compression force with the longitudinal tension force.

(References on following page)

References Cited by the Examiner

UNITED STATES PATENTS

| | | | |
|---|---|---|---|
| 643,045 | 2/00 | Denis | 85—1 |
| 1,159,420 | 11/15 | Rubly. | |
| 2,526,235 | 10/50 | Huck | 85—78 |
| 2,531,048 | 11/50 | Huck | 85—5 |
| 2,531,049 | 11/50 | Huck | 85—5 |
| 2,804,798 | 9/57 | Brilmyer | 85—5 |

WHITMORE A. WILTZ, *Primary Examiner.*